(12) United States Patent
Ono et al.

(10) Patent No.: US 8,107,123 B2
(45) Date of Patent: Jan. 31, 2012

(54) TONE CORRECTION APPARATUS, MOBILE TERMINAL, IMAGE CAPTURING APPARATUS, MOBILE PHONE, TONE CORRECTION METHOD AND PROGRAM FOR IMPROVE LOCAL CONTRAST IN BRIGHT AND DARK REGIONS

(75) Inventors: Yoshiki Ono, Tokyo (JP); Kazuhiro Sugiyama, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 867 days.

(21) Appl. No.: 11/587,903

(22) PCT Filed: Mar. 29, 2005

(86) PCT No.: PCT/JP2005/005850
§ 371 (c)(1),
(2), (4) Date: Oct. 27, 2006

(87) PCT Pub. No.: WO2005/106789
PCT Pub. Date: Nov. 10, 2005

(65) Prior Publication Data
US 2007/0229863 A1 Oct. 4, 2007

(30) Foreign Application Priority Data

Apr. 30, 2004 (JP) ................. 2004-135978
Dec. 1, 2004 (JP) ................. 2004-348180

(51) Int. Cl.
*G06T 5/00* (2006.01)
(52) U.S. Cl. .................. 358/1.9; 382/167; 382/162
(58) Field of Classification Search .............. 358/1.9; 382/162, 167
See application file for complete search history.

(56) References Cited

U.S. PATENT DOCUMENTS
5,296,919 A 3/1994 Maruno et al.
(Continued)

FOREIGN PATENT DOCUMENTS
JP 5-328211 A 12/1993
(Continued)

OTHER PUBLICATIONS

Japan Patent Application Publication JP 10-021386 (English translation), Author: Morimoto, Takeshi; Title: Image Processor; Date: Jan. 23, 1998.*

(Continued)

*Primary Examiner* — Benny Tieu
*Assistant Examiner* — Qian Yang
(74) *Attorney, Agent, or Firm* — Birch, Stewart, Kolasch & Birch, LLP

(57) ABSTRACT

The present invention relates to a technique for correcting tones of a digitized image, for use in a mobile terminal or the like. The use of a conventional image tone correction technique to backlight correction imposes a limit on improvement in local contrast in a bright region or a dark region. According to the present invention, a block timing generation part (102) divides one image area into a plurality of blocks, an average luminance calculation part (103) calculates an average luminance level per block specified at the part 102, a correction-amount-per-block calculation part (104) calculates a direction of correction and a correction amount from an average luminance level per block, a correction-amount-per-pixel calculation part (105) interpolates the correction amount per block into the correction amount per pixel in that block, and a tone conversion part (107) reads out a final correction amount from a tone conversion table part (108), using the correction amount per pixel and luminance data of that pixel read out from a memory (106) as an address, to carry out tone conversion.

17 Claims, 8 Drawing Sheets

U.S. PATENT DOCUMENTS

| | | | |
|---|---|---|---|
| 5,808,697 | A | 9/1998 | Fujimura et al. |
| 5,940,530 | A | 8/1999 | Fukushima et al. |
| 2003/0053689 | A1* | 3/2003 | Watanabe et al. ............ 382/167 |
| 2003/0152283 | A1 | 8/2003 | Moriwaki |
| 2004/0091171 | A1* | 5/2004 | Bone ............................ 382/284 |
| 2004/0257455 | A1* | 12/2004 | Aoyama ................... 348/222.1 |

FOREIGN PATENT DOCUMENTS

| | | |
|---|---|---|
| JP | 7-220066 A | 8/1995 |
| JP | 9-65252 A | 3/1997 |
| JP | 10-21386 A | 1/1998 |
| JP | 2000-59629 A | 2/2000 |
| JP | 2003-69825 A | 3/2003 |
| JP | 2003-299107 A | 10/2003 |

OTHER PUBLICATIONS

Anil K. Jain, Fundamentals of Digital Image Processing, ISBN: 0-13-332578-4, pp. 241-244, published 1990.

Communication from European Patent Office dated Jun. 5, 2008 in connection with European Patent Application No. 05727555.4.

* cited by examiner

F I G. 5
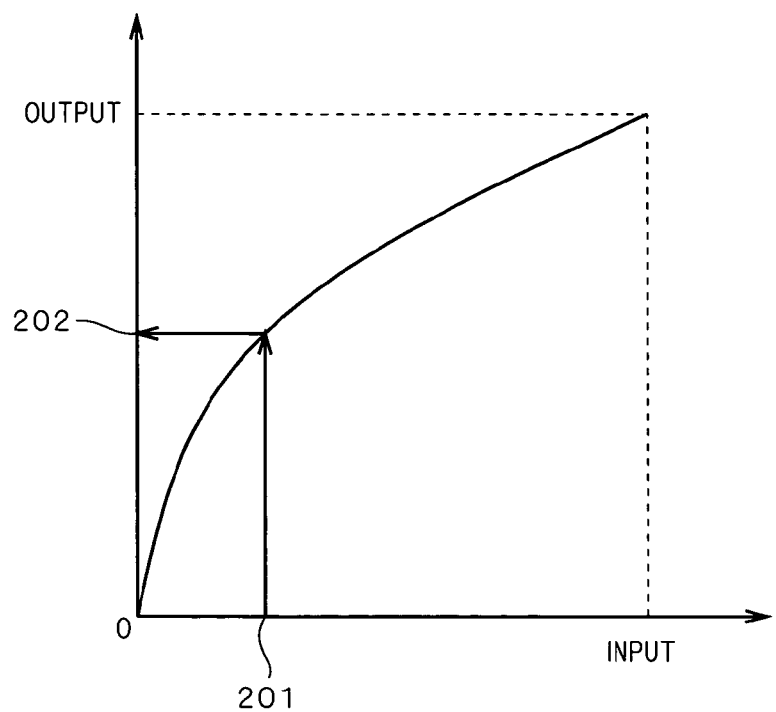
F I G. 6
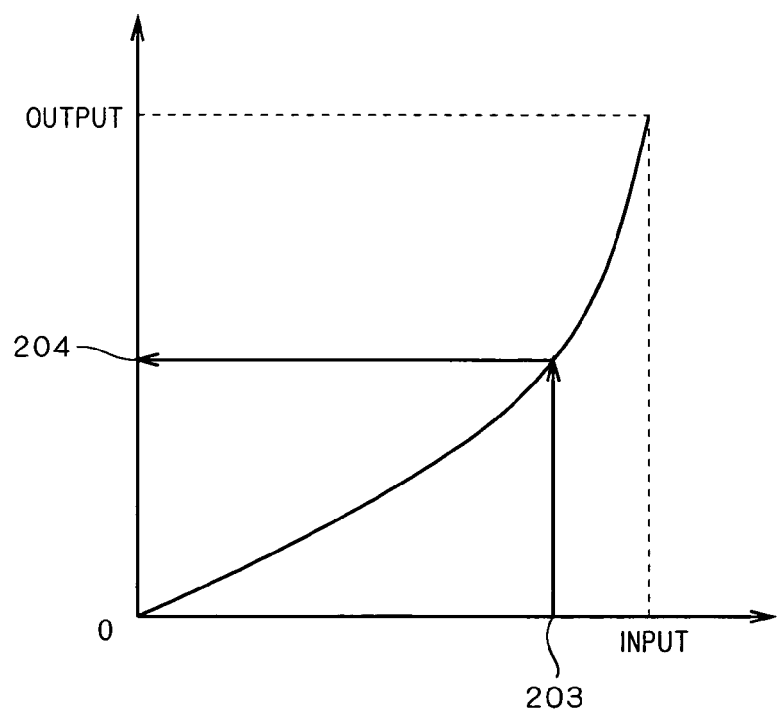

TONE CORRECTION APPARATUS, MOBILE TERMINAL, IMAGE CAPTURING APPARATUS, MOBILE PHONE, TONE CORRECTION METHOD AND PROGRAM FOR IMPROVE LOCAL CONTRAST IN BRIGHT AND DARK REGIONS

TECHNICAL FIELD

The present invention relates to a technique for correcting tones of a digitized image.

BACKGROUND ART

As a conventional technique for correcting tones of an image, the "histogram equalization method" of calculating a luminance value or density value of each pixel across an entire image area of an input image, creating a histogram showing the number of occurrences of pixels having the same tone value or pixels included in the same section obtained by division into less number of sections than a quantized number of tones, and carrying out tone correction processing across the entire image area such that the created histogram has an optimum shape is widely well known (cf. non-patent document 1). With this histogram equalization method of correcting tones of an image using the histogram, optimizing a tone distribution in the case where tones in the image area concentrate in a certain level can achieve improved tone characteristics of the whole image area.

Further, techniques applying such "histogram equalization method" to backlight correction are also proposed (cf. patent documents 1 and 2). These techniques determine the backlight condition on the basis of a histogram of the whole image area to carry out tone correction so as to approach an optimum histogram.

On the other hand, another technique using "local contrast correction method" of diving an image area into a plurality of blocks and correcting a local contrast which is a local contrast on the basis of an average luminance value in a divided block, not the whole image area, is proposed (cf. patent document 3). The use of this "local contrast correction method" as well as the use of the Craik O'Brien effect of giving a luminance gradient to a contour to cause visual illusion because of human eye characteristics can artificially increase the dynamic range.

Patent document 1: Japanese Patent Application Laid-Open No. 2003-69825
Patent document 2: Japanese Patent Application Laid-Open No. 2003-299107
Patent document 3: Japanese Patent Application Laid-Open No. 9-65252
Non-patent document 1: written by ANIL K. JAIN, "Fundamentals of Digital Image Processing", Prentice-Hall International, Inc. publishing, 1989, pp. 241-244

However, in the case of applying the aforementioned conventional technique for correcting tones of an image, the "histogram equalization method" or "local contrast correction method", directly to backlight correction, a problem of imposing a limit in improving the local contrast in a bright region or a dark region arises. The reason for this issue will be described below in detail.

That is, the conventional technique adopting the "histogram equalization method" uses the same tone correction curve across an entire image area, which causes no change in sequence of tone levels in one image area unless the tone correction curve has a negative inclination or unless a discontinuous tone correction curve is used. For instance, in the case where a shadow region and a highlight region concentrate in the vicinity of certain tones, respectively, as shown in a histogram of an input image in FIG. 10, tone correction using the "histogram equalization method" results in a distribution as indicated by solid lines shown in FIG. 11. That is, a histogram 601 of a shadow region is converted into a wider tone distribution 611, which increases the local contrast in the shadow region. A histogram 602 of a highlight region is similarly converted into a wider tone distribution 612, which increases a local contrast of the highlight region. However, neither of the aforementioned conventional techniques allows such conversion as shown in FIG. 12 that a histogram 621 of a shadow region and a histogram 622 of a highlight region after conversion are reversed in sequence of tone levels in some tones. Therefore, since the sequence of tone levels is held after correction in the case where a dark part of a bright region in one image area is brighter than a bright part of another dark region in the same image area, the dark part of the bright region in one image area becomes brighter than the bright part of the dark region in the same image area or is rounded to become identical. Therefore, there exists a limit in correction amount of a dark part of a bright region and a bright part of a dark region, which inevitably causes a limit in improving the local contrast in a bright region in an image area or a dark region in an image area.

Further, the conventional technique adopting the "local contrast correction method" serves to maintain the average luminance value of a local region to some degree in order to perform local contrast correction throughout the entire tones while there may be a phenomenon in which tone levels are reversed in sequence according to places. Therefore, there is a limit on the backlight correction effect for a bright region or a dark region as a whole. For instance, in the case where a bright region or a dark region continues over an area of the size of a divided block or an area exceeding the size of predetermined times larger than a divided block determined by the filter shape per block, tone levels are maintained after correction with respect to the average luminance level of the continuing bright region or dark region as a whole, and the average luminance level after correction does not vary greatly as compared to that prior to the correction. Thus, the contrast of a local region is improved, however, there is a limit on the backlight correction effect for a bright region or a dark region as a whole.

Furthermore, since the conventional technique adopting the "local contrast correction method" performs local contrast correction throughout the entire tones, applying that correction method to backlight correction as-is also increases the local contrast of a block in a midtone level not of concern per se when trying to improve the correction effect on a dark region or a bright region. Therefore, the local contrast can only be improved to such degree that the midtone level is not corrected excessively.

DISCLOSURE OF INVENTION

This invention has been made to solve the above-described problems, and has an object to enable further improvement in local contrast in a bright region or a dark region at the time of backlight correction.

The subject matter of this invention is a tone correction apparatus for carrying out tone correction upon dividing one image area of a digital image into a plurality of local regions, including an average luminance calculation part for obtaining average luminance of each of the local regions across the one image plane of the digital image, a correction amount calculation part for obtaining a correction amount for each of the local regions from the average luminance of each of the local regions, an interpolation part for carrying out interpolation from the correction amount for each of the local regions to a correction amount per pixel, and a tone conversion part for selecting one tone conversion function from among a previously prepared plurality of tone conversion functions on the basis of high and low between the correction amount for each of the local regions and a correction amount corresponding to a median value of all luminance tone levels or high and low between the correction amount per pixel and the correction amount corresponding to the median value of the all luminance tone levels, thereby carrying out tone conversion for correcting luminance of each pixel by the selected tone conversion function using one of the correction amount for each of the local regions and the correction amount per pixel as a parameter.

The subject matter of this invention achieves the following effects 1) to 3).

1) An image area is divided into a plurality of local region (e.g., blocks), and then, the amount of change from an average luminance level of a local region to a luminance level after correction is controlled by the average luminance level of the local region. This achieves an effect of obtaining a good tone correction result as a whole in the entirety of a part in which the same degree of tone level continues widely in area such as a bright region or a dark region while improving the local contrast.

2) The average luminance level of each local region is controlled to increase in level when the local region has a low average luminance level. This achieves an effect of obtaining a good tone correction result as a whole also in the entirety of a part in which a dark region continues widely in area.

3) The average luminance level of each local region is controlled to decrease in level when the local region has a high average luminance level. This achieves an effect of obtaining a good tone correction result as a whole also in the entirety of a part in which a bright region continues widely in area.

These and other objects, features, aspects and advantages of this invention will become more apparent from the following detailed description and the accompanying drawings.

BRIEF DESCRIPTION OF DRAWINGS

[FIG. 5] is a diagram illustrating a tone conversion curve in a shadow region;

[FIG. 6] is a diagram illustrating a tone conversion curve in a highlight region;

BEST MODE FOR CARRYING OUT THE INVENTION

Embodiment 1

The present embodiment features dividing an image area into a plurality of blocks and then controlling the amount of change from an average luminance level of each local region divided as a block to a luminance level after correction by the average luminance level of the local region. Particularly, the present embodiment features controlling the average luminance level of each local region to increase when the average luminance level of the local region is relatively lower than a median value of all luminance tone levels. Conversely, the present embodiment features controlling the average luminance level of each local region to decrease when the average luminance level of the local region is relatively higher than the median value of all luminance tone levels. Further, the present embodiment features (1) controlling a correction amount in luminance correction of a local region to increase when the average luminance level of the local region is relatively lower than the median value of all the luminance tone levels and (2) also controlling the correction amount in luminance correction of a local region to increase when the average luminance level is higher than the median value of all the luminance tone levels, while (3) controlling the correction amount in luminance correction of a local region to decrease when the average luminance level of the local region is in about the middle level (about all luminance tone level). Alternatively, in the present embodiment, the correction amount in luminance correction of a local region is controlled to increase when the average luminance level of the local region is lower than the median value of all the luminance tone levels, and the correction amount in luminance correction of a local region is controlled to decrease when the average luminance level is in about the middle level, and the correction amount in luminance correction of a local region is controlled to be in about the middle level when the average luminance level is higher than the median value of all the luminance tone levels. Hereinafter, the features of the present embodiment will be described in detail on the basis of the accompanying drawings.

Figure 1:
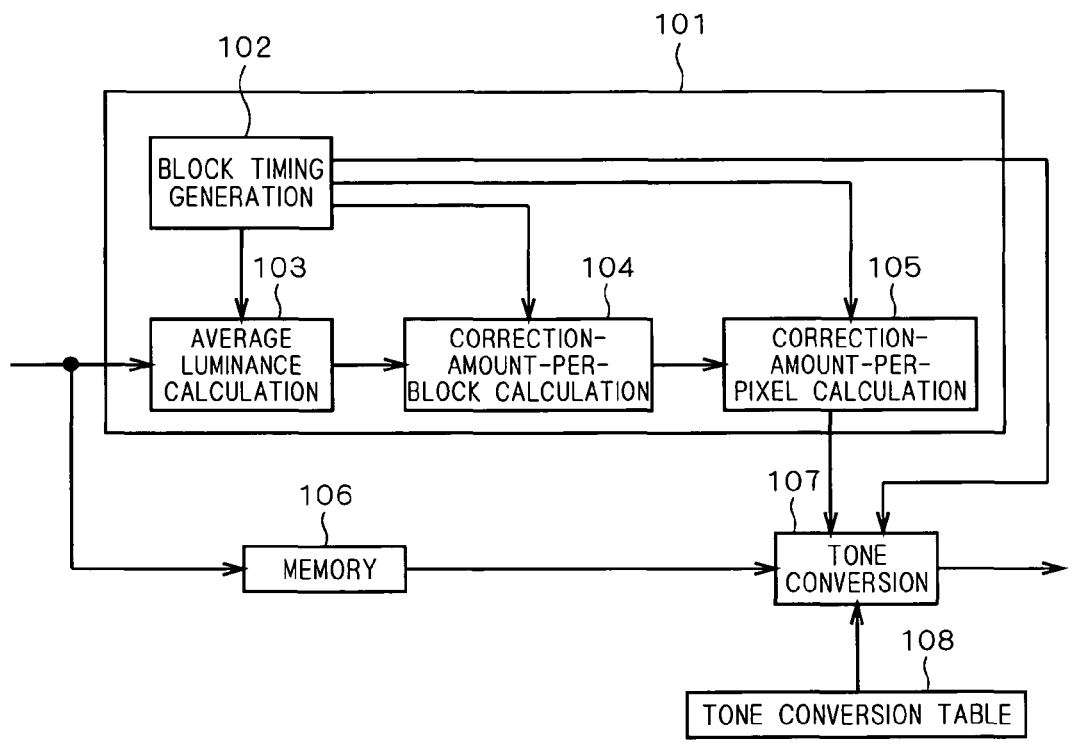
[FIG. 1] is a block diagram illustrating an exemplary configuration of a tone correction apparatus according to Embodiment 1 of this invention.

FIG. 1 is a block diagram illustrating a configuration or functional parts of a tone correction apparatus according to the present embodiment. In FIG. 1, digital image data input to the tone correction apparatus is input to a correction amount calculation part 101 and a memory 106. The correction amount calculation part 101 carries out processing per block (per local region) under the control of a block timing generation part 102 contained therein. First, (1) an average luminance calculation part 103 calculates an average luminance value per block from the input image data. Next, (2) a correction-amount-per-block calculation part 104 calculates a correction amount per block from the input average luminance value per block. Further, (3) a correction-amount-per-pixel calculation part 105 calculates a correction amount per pixel from the input correction amount per block. That is, the correction-amount-per-pixel calculation part 105 serves as an "interpolation part" for carrying out interpolation from the correction amount per block to the correction amount per pixel.

A tone conversion part 107 carries out tone conversion on image data (luminance value data) read out by that part 107 from the memory 106, using the correction amount input from the correction-amount-per-pixel calculation part 105 and conversion table values of a tone conversion table part 108, on the basis of a control signal output from the block timing generation part 102.

Next, the operation of each processing block will be described in detail. First, the memory 106 will be described. Since the correction amount calculation part 101 as a whole produces a delay of one to several block lines, the memory 106 is generally comprised of a line memory that produces an equivalent delay of one to several block lines. In the case where the correction amount calculation part 101 produces a delay per frame, the memory 106 is also comprised of a frame memory that produces an equivalent delay per frame.

On the other hand, with respect to image data input into the correction amount calculation part 101, the average luminance calculation part 103 calculates an average luminance value per block (also called average luminance within block) for each block number generated in the block timing generation part 102. In the case where image data is not in the image data form of luminance/color-difference format when input to the average luminance calculation part 103, format conversion into luminance/color-difference format needs to be carried out prior to obtaining the average luminance. In that case, a block or a function part for carrying out such format conversion is provided in a stage prior to the correction amount calculation part 101. In contrast, in the case where the input image data is used as-is in RGB format, the average luminance calculation part 103 may artificially specify the average value of RGB as an "average luminance value per block", however, the following description deals with digital image data as being input into the correction amount calculation part 101 upon previous conversion into luminance/color-difference format.

The block timing generation part 102 outputs first to fourth control signals that control processing of the parts 103, 104, 105 and 107, respectively, in synchronization with a synchronizing signal of an image signal 1) in the case where a digital image input to the correction amount calculation part 101 is a TV video signal or an image signal of a digital camera module. In contrast, 2) in the case where a digital image to be input to the correction amount calculation part 101 is already stored in a memory (not shown) and a CPU (not shown) reads out the digital image to be input into the correction amount calculation part 101, the block timing generation part 102 outputs first to fourth control signals that control processing of the parts 103, 104, 105 and 107, respectively, in synchronization with a start clock of reading the memory from the CPU.

Figure 2:
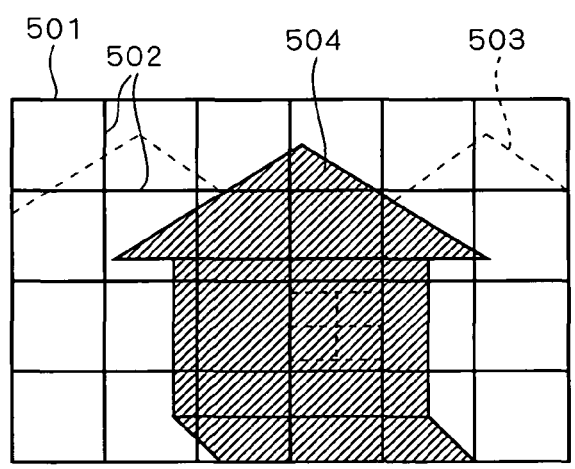
[FIG. 2] is a diagram illustrating block division of an image.

Blocks specified by an instruction (first control signal) from the block timing generation part 102 which divide one image area will now be described using FIG. 2. FIG. 2 is a diagram illustrating block division of an image. In FIG. 2, a reference numeral 501 indicates one entire image area, and the one entire image area 501 is divided into a plurality of blocks by boundary lines 502 extending vertically or horizontally. In the case of performing backlight correction, when an input image contains a significantly bright region and a significantly dark region, a block 503 included in the bright region in the image and a block 504 included in the dark region in the image shall present in the one entire image area 501.

The average luminance calculation part 103 accumulates luminance values of input image data in the same block region to be divided by the number of pixels in the block at last, thereby calculating the average luminance value per block. Here, to simplify the division, the number of pixels of powers of 2 is often used for both vertical and horizontal block dimensions, respectively. Since the block 503 in FIG. 2 is a bright region, the average luminance value of each block 503 obtained by the average luminance calculation part 103 is a relatively high value. Conversely, since the block 504 in FIG. 2 is a dark region, the average luminance value of each block 504 obtained by the average luminance calculation part 103 is a relatively low value.

"Information about the number of pixels" in the aforementioned blocks to be processed by the part 103 (the block number is specified by the aforementioned first control signal) is supplied to the both parts 102 and 103 from a CPU (not shown) for individual blocks 1) in the case where it is variable information, and, in contrast, 2) in the case where it is a fixed value, the fixed "information about the number of pixels" is stored in the both parts 102 and 103.

Figure 3:
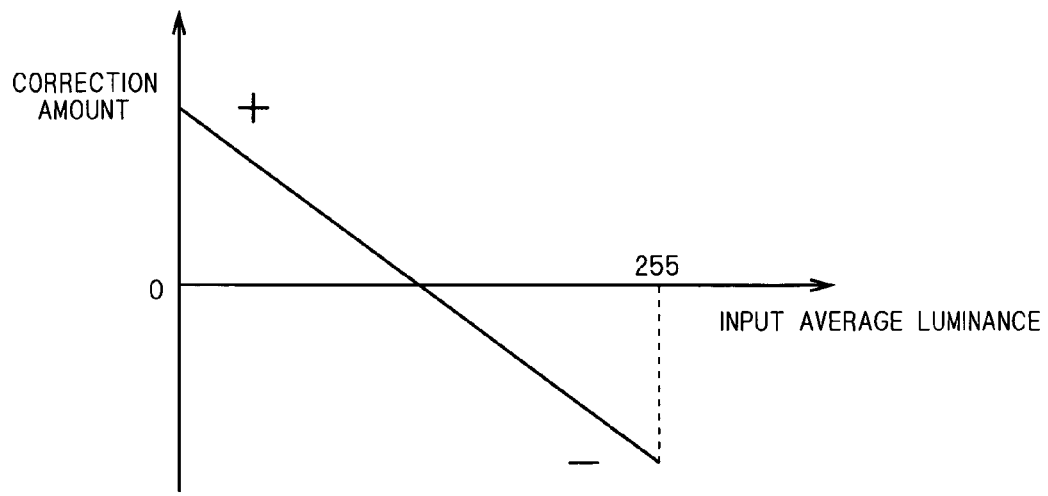
[FIG. 3] is a diagram illustrating control of a correction amount by block average luminance value.

The average luminance value per block obtained in the average luminance calculation part 103 is input to the correction-amount-per-block calculation part 104. The correction-amount-per-block calculation part (also briefly referred to as a correction amount calculation part) 104 calculates a direction of correction and a correction amount per block in accordance with timing (processing start timing instructed by the second control signal) generated by the block timing generation part 102. The correction amount calculation method is as follows: that is, in the case where the average luminance value of a block (unit) to be processed in one image area input to the correction-amount-per-block calculation part 104 is relatively lower than a median value of all the tone levels, the correction-amount-per-block calculation part 104 specifies a large correction amount with respect to the average luminance value of that block (unit) (in this case, specifies the direction of correction as plus) as shown in FIG. 3, and outputs a relatively large correction amount for that block (unit) produced in this manner. Conversely, in the case where the average luminance value per block input to the correction-amount-per-block calculation part 104 is relatively higher than the aforementioned median value, the correction-amount-per-block calculation part 104 specifies a small correction amount with respect to the average luminance value of that block (unit) (in this case, specifies the direction of correction as minus) as shown in FIG. 3, and outputs a relatively small correction amount for that block (unit) produced in this manner. Here, while FIG. 3 illustrates, as an example, the case where an equation for controlling the correction amount by an input average luminance value within block is a straight line, a curve may be used for the above-described equation for correction instead of such straight line. However, the use of a curved control curve increases the amount of processing in the correction-amount-per-block calculation part 104. Therefore, the correction-amount-per-block calculation part 104 usually executes a processing operation for the direction of correction and correction amount by means of an equation for correction of a straight line or comprised of a combination of straight lines. In the case of specifying the "direction of correction" obtained by the correction-amount-per-block calculation part 104 reversely, settings of a correction curve (FIGS. 5 and 6) which will be described later also need to be reversed.

Figure 4:
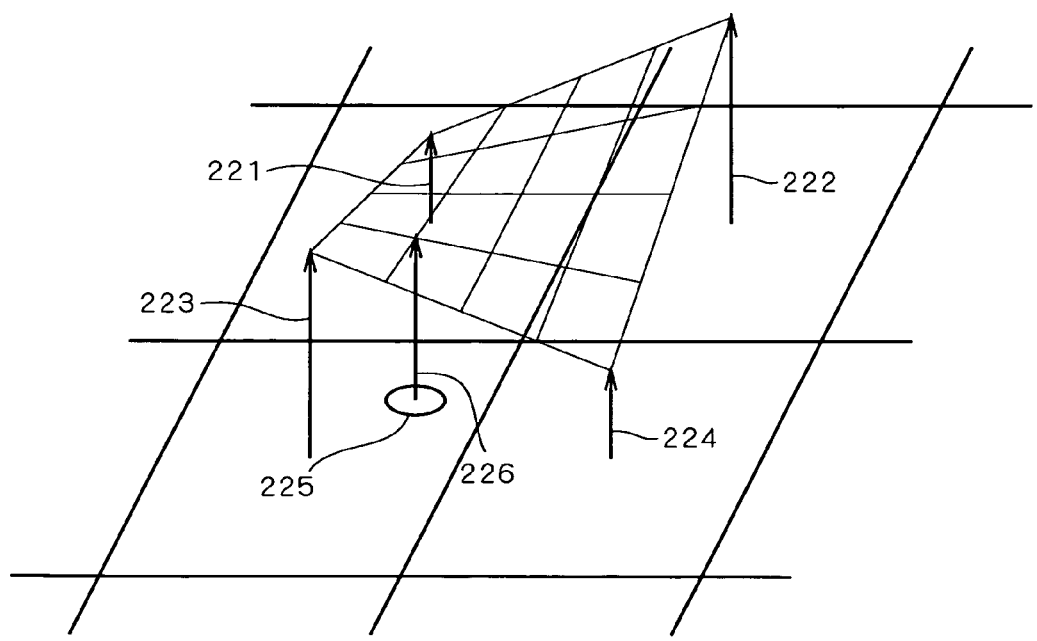
[FIG. 4] is a diagram illustrating how to interpolate for obtaining a correction amount per pixel.

The correction amount of the block (block currently under processing specified by the first control signal) (block unit) output from the correction-amount-per-block calculation part 104 is input to the correction-amount-per-pixel calculation part 105, and is interpolated to the correction amount per pixel in that block. That is, the correction-amount-per-pixel calculation part 105 calculates the "correction amount per pixel" on the basis of the correction amount per block input from the correction-amount-per-block calculation part 104 and information about "block number" and "offset position within block" (the offset position within block is a position of each pixel belonging to a block, specified by positional coordinates that defines one of four corners of each block as an original point) both input from the block timing generation part 102. Interpolation for obtaining the correction amount per pixel at that time is illustrated in FIG. 4, as an example. In FIG. 4, a reference numeral 221 is a correction amount of a block whose gravity center is positioned on the upper left side of a position 225 of a "target pixel" to be interpolated (positional relationship of that target pixel position 225 with respect to the gravity center of that block is defined by an offset position within that block to which that target pixel belongs). Similarly, reference numerals 222, 223 and 224 are correction amounts of blocks whose gravity centers are positioned on the upper right side of the target pixel position 225, on the lower left side of the target pixel position 225, and on the lower right side of the target pixel position 225, respectively. A correction amount 226 at the target pixel position 225 is obtained by linear interpolation from the correction amounts per block in the surrounding four blocks, using the offset position within block input from the block timing generation part 102. For instance, defining the offset coordinates of the gravity position of the block to which the reference numeral 221 belongs as (0, 0), on the basis of the offset coordinates, offset coordinates of the gravity positions of the rest of surrounding three blocks are defined. Therefore, the part 105 can obtain a linear interpolation coefficient on the basis of these four offset coordinates, and the part 105 can thereby calculate the correction amount of the target pixel at the position 225. Such calculation of correction amount by linear interpolation is executed on all target pixels in the block to which the position 225 belongs. While simple linear interpolation is illustrated as an example, here, the correction-amount-per-pixel calculation part 105 may adopt spline interpolation, multi-order polynominal interpolation or another curve-employed interpolation method.

While the above description adopts "block unit" defining one block as a "local region", an integral multiple, or an integral submultiple, or an integral multiple of a submultiple, of a block size based on the block unit may be specified as one unit instead in processing in the respective parts 103 and 104. In that sense, these units when dividing one image area of a digital image into a plurality of pieces are defined as "local regions". Therefore, in other words, it can be said that one image area of a digital image is divided into a plurality of local regions under the specification control by the block timing generation part 102, and calculations in the respective parts 103 and 104 are then carried out with timing per local region.

Similarly, while the processing unit of the correction-amount-per-pixel calculation part 105 has been described as "pixel unit", an integral multiple, or an integral submultiple, or an integral multiple of a submultiple, of a pixel size based on the pixel unit may be specified as "one unit" in processing in the correction-amount-per-pixel calculation part 105.

The correction amount per pixel output from the correction-amount-per-pixel calculation part 105 is input to the tone conversion part 107. The tone conversion part 107 reads out data corresponding to the pixel specified by the block timing generation part 102 from the tone conversion table part 108 by using the correction amount per pixel of that pixel and the luminance level of that pixel read out by that part 107 from the memory 106 as an address in the previously prepared tone conversion table part 108, so that the part 107 obtains luminance data after correction. The tone conversion table part 108 stores a first conversion curve that increases tones of a shadow part to extend the dynamic range of the shadow part as shown in, e.g., FIG. 5, (A) in the case where the correction amount obtained in the correction-amount-per-pixel calculation part 105 is relatively larger than the median value of all the luminance tone levels; and stores a second conversion curve that increases tones of a highlight part to extend the dynamic range of the highlight part as shown in, e.g., FIG. 6, (B) in the case where, in contrast, the correction amount obtained in the correction-amount-per-pixel calculation part 105 is small. Here, curved tone conversion curves such as shown in FIGS. 5 and 6 are illustrated as examples, however, a combination of straight lines may be applied to tone conversion in order to simplify calculations to reduce circuit scale and consumption power or to achieve improved processing speed. Alternatively, instead of this example in which the tone conversion table part 108 is previously prepared, the tone conversion part 107 may be configured to obtain a conversion table by itself by sequential calculations, or a modification may be made such that the tone conversion part 107 executes correction by direct calculations from the input correction amount without using a conversion table. In that sense, it can be said that the tone conversion table part 108 is not a compulsory element, but an arbitrary element. As already described, in the case of modification in which the graph of correction amount shown in FIG. 3 is reversed in plus and minus, such modification becomes equivalent to this example by reversing tone conversion characteristics shown in FIGS. 5 and 6 as well. The tone conversion table 108 is comprised of, for example, a storage device or a gate circuit.

Figure 7:
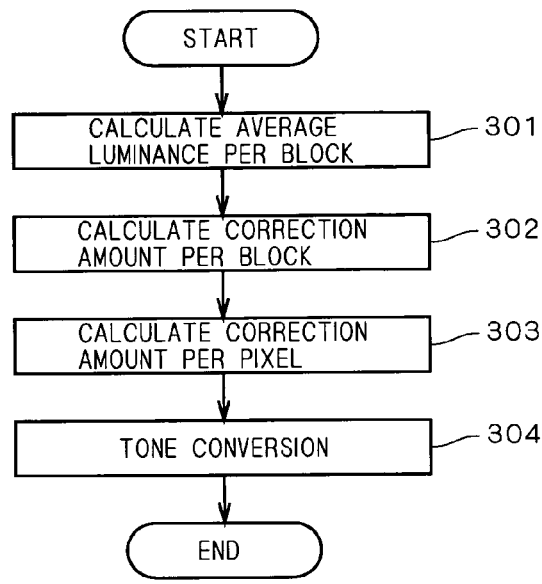
[FIG. 7] is a flow chart illustrating a tone correction method according to Embodiment 1 of this invention.

Here, FIG. 7 is a flow chart illustrating the principles of tone correction processing described earlier, or FIG. 7 illustrates respective processing steps in a software program that can be executed by a computer. First, in an average luminance calculation step 301, the average luminance value per block is calculated on an input image. In the next correction-amount-per-block calculation step 302, a correction amount per block is calculated from the average luminance value on the basis of the direction of correction. Further, in the next correction-amount-per-pixel calculation step 303, a correction amount per pixel is calculated (interpolated) from the input correction amount per block, and then, in the final tone conversion step 304, final tone conversion per pixel is carried out using the input correction amount per pixel.

The direction of correction and correction amount per block is controlled by the average luminance value per block of the input image, as shown in, e.g., FIG. 3. Then, calculation of the correction amount per pixel from the correction amount per block is executed by linear interpolation shown in, e.g., FIG. 4. Further, in the tone conversion step 304, tones are converted using the mapping curve such as shown in, e.g., FIG. 5 or 6.

At this time, in the case where the average luminance value of a local region obtained by dividing an input image into a plurality of blocks is lower than the median value of all the luminance tone levels as the block 504 shown in FIG. 2, the mapping curve shown in FIG. 5 is selected and adopted. In this case, among all pixels in the block 504, a pixel whose correction amount per pixel calculated by the functional part 105 or step 303 is equal to an average luminance value 201 of that block is also converted to a luminance level 202 that corresponds to a tone level higher than the level 201. Similarly, as to other pixels whose correction amounts per pixel calculated by the functional part 105 are positioned in the vicinity of the average luminance value 201, their tone levels are also converted to higher tone levels, respectively, by application of FIG. 5. In this respect, by the method shown in the conventional patent document 3, the average luminance level within block is stored, and accordingly, the average luminance of a shadow region of an image is also stored, so that the entire shadow region of the image remains dark after tone conversion. In contrast, by the method described in the present embodiment, the average luminance level within block is also changed as described above, and accordingly, a shadow region of an image is converted to be bright as a whole, so that visibility of an intuitive dark region can be improved. That is, the effect of backlight correction can be improved.

In contrast, in the case where the average luminance value of a local region obtained by dividing an input image into a plurality of blocks is high as the block 503 shown in FIG. 2, the mapping curve shown in FIG. 6 is selected and adopted, and among all pixels in the block 503, with respect to a pixel whose correction amount per pixel calculated by the functional part 105 or step 303 is equal to an average luminance value 203 of that block, the average luminance value 203 of that block is also converted to a luminance level 204 that corresponds to a tone level lower than the level 203. Similarly, other tone levels in the vicinity of the average luminance value 203 are also converted to lower tone levels, respectively. In this respect, by the method shown in the conventional patent document 3, the average luminance level within block is stored, and accordingly, the average luminance of a highlight region of an image is also stored, so that the entire highlight region of the image remains bright after tone conversion. In contrast, by the method described in the present embodiment, the average luminance level within block is also changed as described above, and therefore, a highlight region of an image is converted to be dark as a whole, so that visibility of an intuitive bright region can be improved. That is, the effect of backlight correction can be improved.

Here, when the average luminance value of a local region obtained by dividing an input image into blocks is in about the middle level, that is, in about the middle of all the luminance tone levels, the correction amount at the time of carrying out tone correction using the mapping curves shown in FIGS. 5 and 6 is set smaller than when the average luminance value is low, that is, at about the lower limit of all the luminance tone levels, and when the average luminance value is high, that is, at about the upper limit of all the luminance tone levels. Such settings result in effects of achieving significantly improved visibility of a dark region while reducing an influence caused by correction in a midtone level region whose tone level has originally been appropriate as well as achieving improved visibility of a bright region while reducing a human subjective adverse influence due to a reduction in luminance.

Further, it is more desirable that the absolute value of the correction amount when the average luminance value is low be set higher than the absolute value of the correction amount when the average luminance value is high. This is particularly effective in the application to backlight correction, which is effective at ensuring a correction amount of a dark region while showing a bright region particularly like an image of daytime sky or the like more natural.

Further, by the method described in the present embodiment, an image is processed upon division into a plurality of blocks of small regions (local regions) as shown in FIG. 2 and further, a correction amount is assigned independently to each pixel by the correction-amount-per-pixel calculation step 303 (FIG. 7), and in the subsequent tone conversion step 304 (FIG. 7), a mapping curve for tone correction is selected independently for each single pixel. Therefore, different places, even if they originally have the same tone level, may be output as different tone levels after tone conversion.

Figure 10:
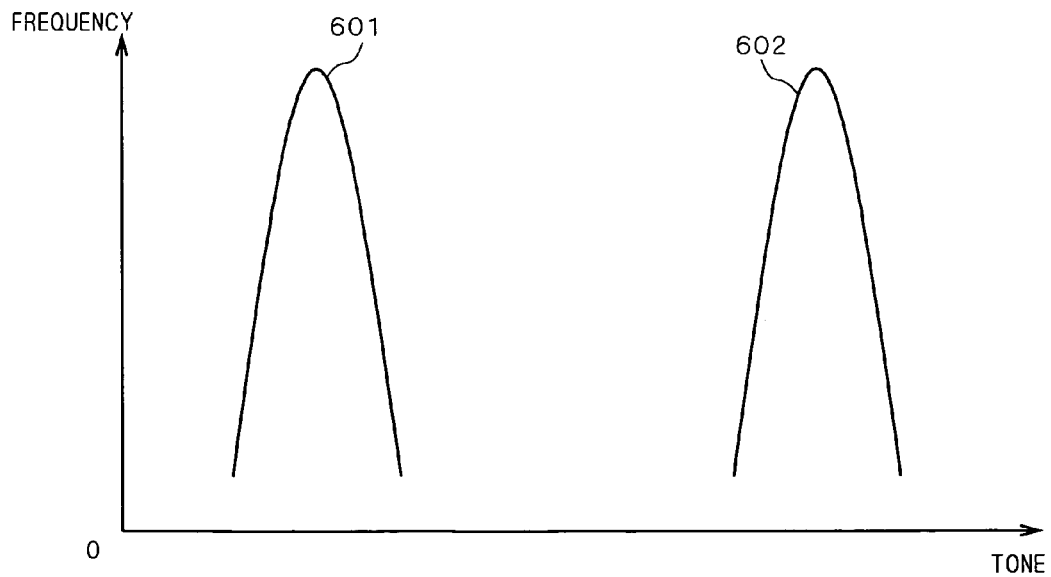
[FIG. 10] is a diagram illustrating a histogram of an input image.
Figure 11:
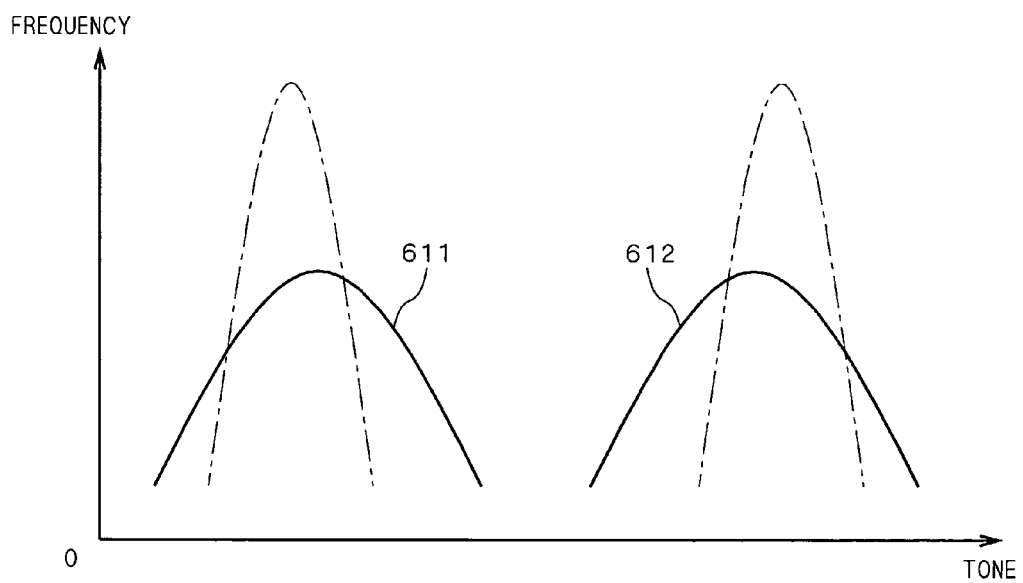
[FIG. 11] is a diagram illustrating a histogram of an image after conversion.
Figure 12:
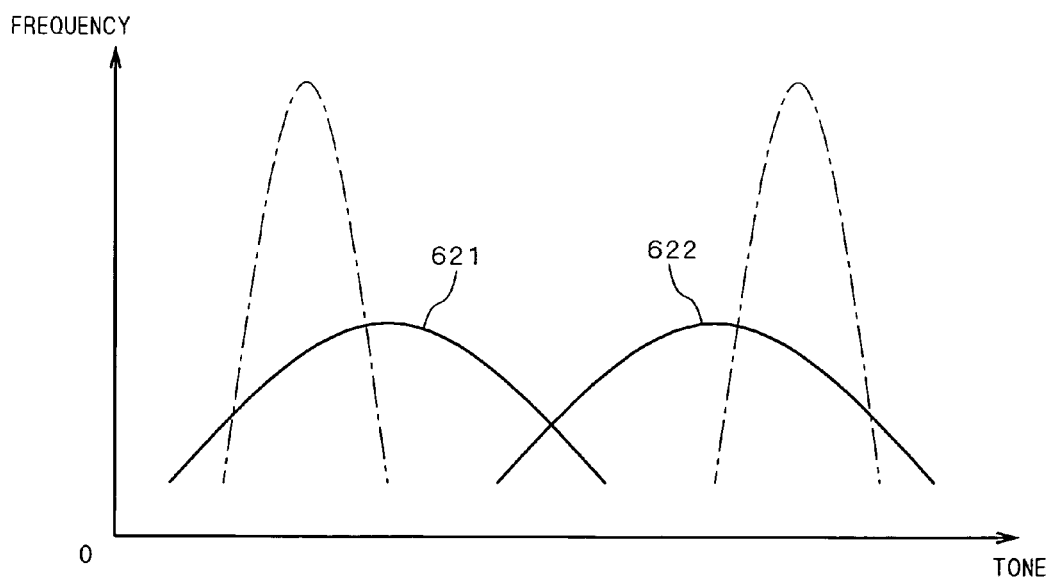
[FIG. 12] is a diagram illustrating a histogram of an image after conversion.

For instance, regarding a histogram of an input image, when adopting the conventional histogram equalization method in the case where the shadow region 601 and highlight region 602 concentrate in the vicinity of certain tones, respectively, as shown in FIG. 10, the distribution indicated by solid lines shown in FIG. 11 is obtained, and the histogram 611 of the shadow region and the histogram 612 of the highlight region after conversion do not cause reversed sequence of tone levels in some tones. However, in the case of adopting the method described in the present embodiment, the histogram 621 of the shadow region and the histogram 622 of the highlight region after conversion may cause reversed sequence of tone levels in some tones, as shown in FIG. 12.

This means that the local dynamic range is extended further as compared to the conventional method of using a continuous mapping curve without reverse in tones over the one entire image area which does not cause change in sequence of tones depending on places. That is, execution of the above-described series of processing upon dividing one image area of an image into a plurality of blocks has made it possible to use optimum mapping curves for a shadow region and a highlight region of the image, respectively. Therefore, the shadow region of the image can be increased in dynamic range without considering degradation in tone characteristics of the highlight region, while the highlight region of the image can be increased in dynamic range without considering degradation in tone characteristics of the shadow region. That is, the backlight correction effect can be increased. In addition, flexibility in setting a mapping curve is improved, which can avoid additional processing for compromising both the shadow region and highlight region.

This, further, also means that the method described in the present embodiment is not just a simple change of the backlight correction method of the entire image area using the conventional histogram equalization method to backlight correction processing per block. That is, simply changing the conventional technique for detecting the backlight condition in an image area on the basis of a histogram of the entire image area to correct the backlight condition in the image area, to a block-by-block basis will result in detection of the backlight condition in a block and correction of the backlight condition in the block. However, the aforementioned method adopted by the apparatus according to the present embodiment does not detect the backlight condition in a block nor correct the backlight condition in the block. This method is to correct the backlight condition between a plurality of blocks on the basis of the luminance average value within block, which, therefore, can correct the backlight condition of the entire image area as a result without creating a histogram.

Further, since the method described in the present embodiment allows correction of the entire image area only by sequentially using information about local regions, there is no need to wait until preprocessing of the one entire image area is finished, which enables real-time processing without frame delays only by using such line memory that blocks are included or about two- or three-times more line memories than the line memory without requiring a frame memory in the circuit.

As described above, the image area is divided into a plurality of blocks, and the correction amount in luminance correction of a local region is increased when the average luminance level of a local region divided as a block is low, and the correction amount in luminance correction of the local region is decreased when the average luminance level is in about the middle level. This can achieve improved visibility of a dark region while reducing the influence caused by correction in a midtone level area whose tone level has originally been appropriate.

Further, the correction amount in luminance correction of a local region is increased when the image area is divided into a plurality of blocks and the average luminance level of a local region divided as a block is low, and the correction amount in luminance correction of the local region is decreased when the average luminance level is in about the middle level, and the correction amount in luminance correction of the local region when the average luminance level is high. This can achieve improved visibility of a dark region and a bright region while reducing the influence caused by correction in a midtone level area whose tone level has originally been appropriate.

Alternatively, the correction amount in luminance correction of a local region may be increased when the image area is divided into a plurality of blocks and the average luminance level of a local region divided as a block is low, and the correction amount in luminance correction of the local region may be decreased when the average luminance level is in about the middle level, and the correction amount in luminance correction of the local region may be set in about the middle level when the average luminance level is high. At this time, there are advantages of achieving significantly improved visibility of a dark region while reducing the influence caused by correction in a midtone level area whose tone level has originally been appropriate, and achieving improved visibility of a bright region while reducing a human subjective adverse influence due to a reduction in luminance.

Embodiment 2

The present embodiment features controlling the amount of change from the average luminance level of a local region to the luminance level after correction also by an average color-difference vector of the local region. Further, the present embodiment also features controlling the amount of change from the average luminance level of a local region to the luminance level after the correction so as to be small when the average color-difference vector of the local region is in the vicinity of almost skin color. Hereinafter, the features of the present embodiment will be described in detail on the basis of the accompanying drawings.

Figure 8:
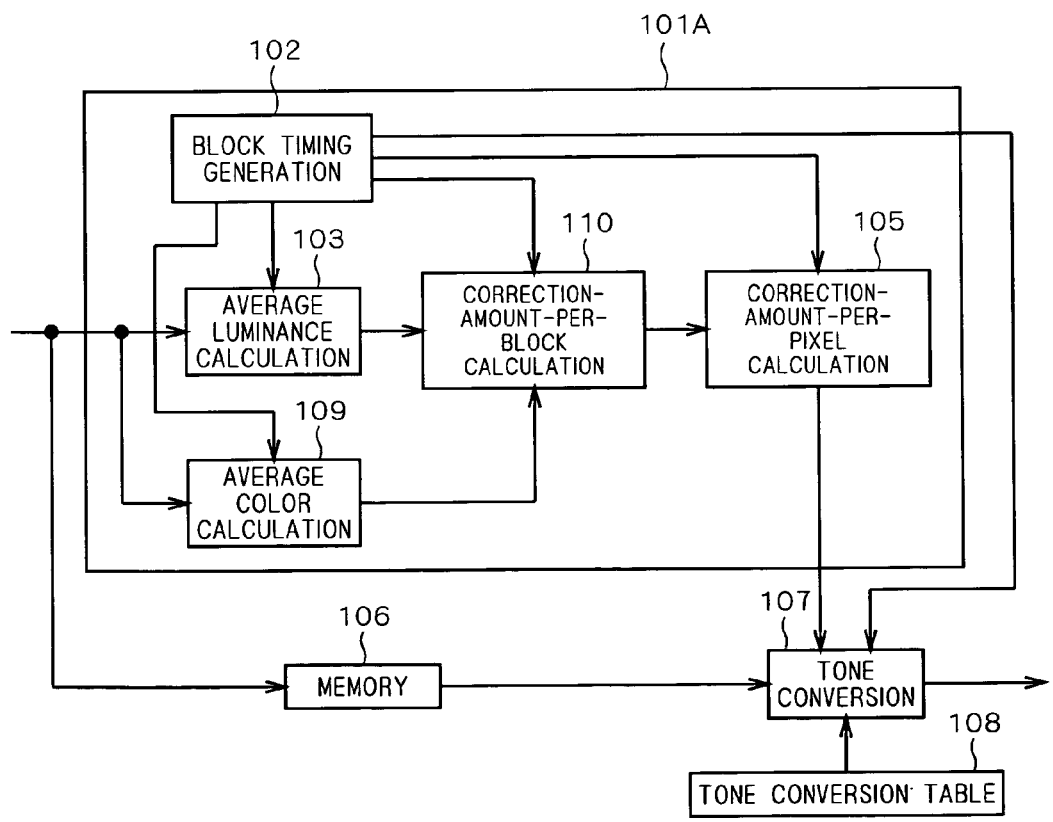
[FIG. 8] is a block diagram illustrating an exemplary configuration of a tone correction apparatus according to Embodiment 2 of this invention.

FIG. 8 is a diagram illustrating a block configuration of a tone correction apparatus according to the present embodiment. The configuration in FIG. 8 only differs from that of FIG. 1 in respective parts 109 and 110 in FIG. 8, and other elements are the same as corresponding elements in FIG. 1.

In FIG. 8, image data input to the tone correction apparatus is input to a correction amount calculation part 101A and the memory 106. In the correction amount calculation part 101A, processing per block is carried out by the block timing generation part 102. First, in the average luminance calculation part 103, the average luminance value per block is obtained from the image data. In parallel with this, in an average color calculation part 109, an average color per block is obtained from the image data. Next, in a correction-amount-per-block calculation part 110, a correction amount per block is obtained from the average luminance value and average color per block. Further, in the correction-amount-per-pixel calculation part 105, a correction amount per pixel is obtained from the correction amount per block. In the tone conversion part 107, tone conversion is carried out on image data read out from the memory 106, using the correction amount from the correction-amount-per-pixel calculation part 105 and the tone conversion table part 108.

Next, the operation of each processing block will be described in detail. First, the memory 106 will be described. Since the correction amount calculation part 101 as a whole produces a delay of one to several block lines, the memory 106 is generally comprised of a line memory that produces an equivalent delay of one to several block lines. In the case where the correction amount calculation part 101 produces a delay per frame, the memory 106 is also comprised of a frame memory that produces an equivalent delay per frame.

On the other hand, with respect to image data input to the correction amount calculation part 101A, average luminance within block is obtained in the average luminance calculation part 103 for each block number generated in the block timing generation part 102. Similarly, an average color within block is obtained in the average color calculation part 109. In the case where the image data is not in the form of luminance/color-difference format when input to the average luminance calculation part 103, format conversion into luminance/color-difference format needs to be carried out prior to obtaining the average luminance and average color. In the case where the input image data is used as-is in RGB format, the average value of RGB may be artificially used as a luminance value, however, the following description deals with image data as being previously input in luminance/color-difference format.

Here, blocks generated in the block timing generation part 102 will now be described using FIG. 2. In FIG. 2, the reference numeral 501 indicates one entire image area, and the one entire image area 501 is divided into a plurality of blocks by boundary lines 502. In the case of performing backlight correction, when an input image contains a significantly bright region and a dark region, for example, the block 503 included in the bright region in the image and the block 504 included in the dark region in the image shall present in the one entire image area 501.

The average luminance calculation part 103 accumulates luminance values of input image data in the same block region to be divided by the number of pixels in the block at last, thereby calculating the average luminance within block. To simplify the division, the number of pixels of powers of 2 is often used for both vertical and horizontal block dimensions, respectively. Since the block 503 in FIG. 2 is a bright region, the average luminance value output from the average luminance calculation part 103 becomes a high value. Further, since the block 504 in FIG. 2 is a dark region, the average luminance value output from the average luminance calculation part 103 becomes a low value.

The average color calculation part 109 accumulates colors of input image data in the same block region to be divided by the number of pixels in the block at last, thereby calculating the average color within block. To simplify the division, the number of pixels of powers of 2 is often used for both vertical and horizontal block dimensions, respectively. As color data for obtaining the average color, color-difference of luminance/color-difference format is generally used. In the case where the luminance/color-difference format is Y, Cb, Cr, for example, an average value is obtained for each of Cb and Cr using two components of Cb and Cr to output a color vector composed of two components of the average value of Cb and average value of Cr as obtained. Hereinafter, however, this color vector will be briefly referred to as an average color.

Here, in the case of using only a certain color component such as skin color as color information, a scalar amount of a difference between that certain color and average color within block may previously be obtained to be output as a scalar value of a certain color degree instead of the color vector. Alternatively, not obtaining the difference after obtaining the average color within block, but in more detail, a difference between a certain color and pixel color may be obtained per pixel, and an average of difference values may be obtained at last to output the difference value as a scalar value of certain color degree. Hereinafter, the scalar value of certain color degree will be briefly referred to as an average color, similarly to the above-described color vector.

Here, only the color difference is used for obtaining the average color, however, both of color-difference and luminance may be used to obtain the average color including luminance information in the case where, for example, only bright skin color is target. Since the correction amount is calculated using both information of the average luminance obtained from luminance and the average color obtained from color-difference in the post-stage correction-amount-per-block calculation part 110, luminance information and color-difference information may be combined in the correction-amount-per-block calculation part 110, if it is on a block-by-block basis, however, in the case where it is preferable to previously combine the luminance information and color-difference information per pixel, the average color including the luminance information shall previously be obtained using both color-difference and luminance in the average color calculation part 109.

The average luminance value within block obtained in the average luminance calculation part 103 and the average color obtained in the average color calculation part 109 are input to the correction-amount-per-block calculation part 110. In the correction-amount-per-block calculation part 110, the correction amount per block is calculated with timing specified in the block timing generation part 102. In the case where the average luminance value within block input to the correction-amount-per-block calculation part 110 is low, the correction amount output from the correction-amount-per-block calculation part 110 is increased as shown in FIG. 3. Conversely, in the case where the average luminance value within block input to the correction-amount-per-block calculation part 110 is high, the correction amount output from the correction-amount-per-block calculation part 110 is decreased as shown in FIG. 3. Here, while FIG. 3 illustrates, as an example, the case where an equation for controlling the correction amount by the input average luminance value within block is a straight line, this straight line may be a curve. However, the use of a curved control curve increases the amount of processing. Therefore, control is usually exercised with a straight line or combination of straight lines. In the case of specifying the direction of correction reversely, a correction curve which will be described later also needs to be reversed.

On the other hand, in the case where the average color input from the average color calculation part 109 is almost skin color, the correction amount output from the correction-amount-per-block calculation part 110 is decreased similarly to the case of luminance average value. Conversely, in the case where the average color input from the average color calculation part 109 is away from skin color on a chromaticity diagram, the correction amount output from the correction-amount-per-block calculation part 110 is increased. This equation may be a straight line or combination of straight lines, or a curve, however, the use of a curved control curve increases the amount of processing. Therefore, control is usually exercised with a straight line or combination of straight lines.

The correction amount per block output from the correction-amount-per-block calculation part 110 is input to the correction-amount-per-pixel calculation part 105. In the correction-amount-per-pixel calculation part 105, the correction amount per pixel is calculated from the correction amount per block input from the correction-amount-per-block calculation part 110 and the block number and offset position within block input from the block timing generation part 102. Interpolation for obtaining the correction amount per pixel is illustrated in FIG. 4. The reference numeral 221 is a correction amount of a block whose gravity center is positioned on the upper left side of the target pixel position 225. Similarly, reference numerals 222, 223 and 224 are correction amounts of blocks whose gravity centers are positioned on the upper right side of the target pixel position 225, on the lower left side of the target pixel position 225, and on the lower right side of the target pixel position 225, respectively. When obtaining the correction amount 226 at the target pixel position 225, it is obtained by linear interpolation from the correction amounts of the surrounding four blocks, using the offset position within block input from the block timing generation part 102. While simple linear interpolation is illustrated as an example, here, spline interpolation, multi-order polynominal interpolation or another curve-employed interpolation method may be adopted. The above description describes block unit, however, an integral multiple, or an integral submultiple, or an integral multiple of a submultiple, of a block size based on the block unit may be specified as one unit. Similarly, with respect to the expression of pixel unit, an integral multiple, or an integral submultiple, or an integral multiple of a submultiple, of a pixel size based on the pixel unit may be specified as one unit.

The correction amount per pixel output from the correction-amount-per-pixel calculation part 105 is input to the tone conversion part 107. In the tone conversion part 107, the correction amount per pixel and luminance level of pixel read out from the memory 106 are used as an address in the previously prepared tone conversion table part 108 thereby to read out data from the table part 108, so that data after correction can be obtained. The tone conversion table part 108 stores a conversion curve that increases tones of a shadow part to extend the dynamic range of the shadow part as shown in, e.g., FIG. 5 in the case where the correction amount is large, and stores a conversion curve that increases tones of a highlight part to extend the dynamic range of the highlight part as shown in, e.g., FIG. 6 in the case where, in contrast, the correction amount is small. Here, curved tone conversion curves are shown in FIGS. 5 and 6, however, a combination of straight lines may be used in order to simplify calculations to reduce circuit scale and consumption power or to achieve improved processing speed. Further, the example of previously preparing the conversion table has been illustrated, however, it may be configured to obtain a conversion table by sequential calculations, or correction may be carried out by direct calculations from the correction amount without using a conversion table. Further, in the case where the graph of correction amount shown in FIG. 3 is reversed in plus and minus, it becomes equivalent by reversing tone conversion characteristics shown in FIGS. 5 and 6 as well.

Figure 9:
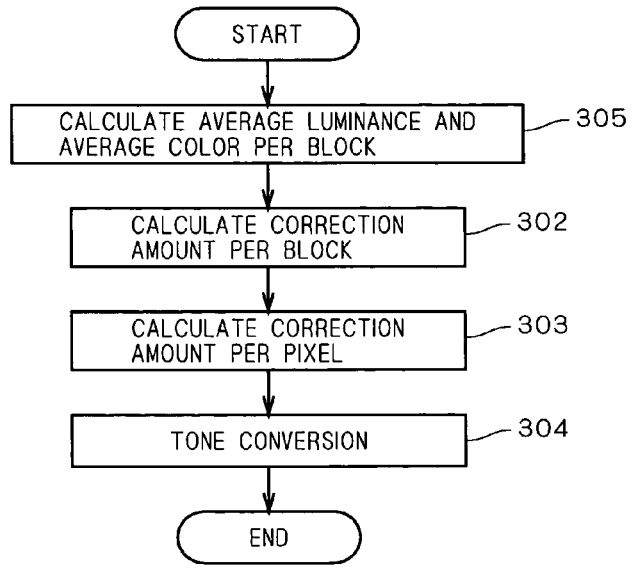
[FIG. 9] is a flow chart illustrating a tone correction method according to Embodiment 2 of this invention.

FIG. 9 is a flow chart illustrating the principles of tone correction processing according to the present embodiment. It only differs from processing steps in the flow chart of FIG. 7 in the following steps 305 and 302. That is, in the average luminance and average color calculation step 305, an average luminance value and an average color per block are calculated on an input image. In the correction-amount-per-block calculation step 302, the correction amount per block is calculated from the average luminance value and average color. In the correction-amount-per-pixel calculation step 303, the correction amount per pixel is calculated from the input correction amount per block. In the tone conversion step 304, tone conversion is carried out using the input correction amount per pixel.

The correction amount per block is controlled by the average luminance value per block of an input image as shown in FIG. 3, and similarly, also by the average color of that block unit. Then, when calculating the correction amount per pixel from the correction amount per block, linear interpolation shown in FIG. 4 is used.

In the tone conversion step 304, when carrying out tone conversion, the mapping curve such as shown in, e.g., FIG. 5 or 6 is used. At this time, in the case where the average luminance value of each local region obtained by dividing an input image into a plurality of blocks is low like the block 504 shown in FIG. 2, the mapping curve shown in FIG. 5 is used. When the correction amount for a certain pixel unit is equal to the average luminance value of a block to which that pixel belongs, the average luminance value 201 of that block is converted to the level of luminance value 202 having a higher tone level. Similarly, tone levels in the vicinity of the average luminance value are converted to higher tone levels, respectively.

By the method shown in the conventional patent document 3, the average luminance level within block is stored, and accordingly, the average luminance of a shadow region of an image is also stored, so that the entire shadow region of the image remains dark after tone conversion.

In contrast, by the method described in the present embodiment, the average luminance level within block is also changed, and accordingly, the entire shadow region of an image is converted to be bright, so that visibility of an intuitive dark part can be improved. That is, the backlight correction effect can be improved.

Conversely, in the case where the average luminance value of a local region obtained by dividing an input image into blocks is relatively high like the block 503 shown in FIG. 2, the mapping curve shown in FIG. 6 is used, and the average luminance value 203 of the block is converted to the luminance level 204 having a tone level lower than that level. Similarly, tone levels in the vicinity of the average luminance value are also converted to lower tone levels, respectively.

By the method shown in the conventional patent document 3, the average luminance level within block is stored, and accordingly, the average luminance of a highlight region of an image is also stored, so that the entire highlight region of the image remains bright after tone conversion.

In contrast, by the method described in the present embodiment, the average luminance level within block is also changed, and accordingly, the entire highlight region of an image is converted to be dark, so that visibility of an intuitive bright part can be improved. That is, the backlight correction effect can be improved.

Here, when the average luminance value of a region obtained by dividing an input image into blocks is in about the middle level, that is, in about the middle of all the luminance tone levels, the correction amount at the time of carrying out tone correction using the mapping curves shown in FIGS. 5 and 6 is set smaller than when the average luminance is low, that is, about the lower limit of all the luminance tone levels, and when the average luminance value is high, that is, at about the upper limit of all the luminance tone levels. This produces the effects of achieving significantly improved visibility of a dark region while reducing an influence caused by correction in a midtone level region whose tone level has originally been appropriate as well as achieving improved visibility of a bright region while reducing a human subjective adverse influence due to a reduction in luminance.

Further, it is more desirable that the absolute value of the correction amount when the average luminance value is low be set higher than the absolute value of the correction amount when the average luminance value is high. This is particularly effective in the application to backlight correction, which is effective at ensuring a correction amount of a dark region while showing a bright region particularly like an image of daytime sky or the like more natural.

Further, by the method described in the present embodiment, an image is processed upon division into a plurality of blocks of small regions as shown in FIG. 2 and further, a correction amount is assigned independently to each pixel by the correction-amount-per-pixel calculation step 303, and in the subsequent tone conversion step 304, a mapping curve for tone correction is selected independently for each single pixel. Therefore, different places, even if they originally have the same tone level, may be output as different tone levels after tone conversion.

For instance, as shown in the histogram of an input image of FIG. 10, when adopting the conventional histogram equalization method in the case where a shadow region and a highlight region concentrate in the vicinity of certain tones, respectively, the distribution indicated by solid lines in FIG. 11 is obtained, and the histogram 611 of the shadow region and the histogram 612 of the highlight region after conversion do not cause reversed sequence of tone levels in some tones. However, in the case of adopting the method described in the present embodiment, the histogram 621 of the shadow region and the histogram 622 of the highlight region after conversion may cause reversed sequence of tone levels in some tones, as shown in FIG. 12.

This means that the local dynamic range is extended further as compared to the conventional method of using a continuous mapping curve without reverse in tones over the one entire image area which does not cause change in sequence of tones depending on places. That is, execution of the above-described series of processing upon dividing one image area of an image into a plurality of blocks has made it possible to use optimum mapping curves for a shadow region and a highlight region of the image, respectively. Therefore, the shadow region of the image can be increased in dynamic range without considering degradation in tone characteristics of the highlight region, while the highlight region of the image can be increased in dynamic range without considering degradation in tone characteristics of the shadow region. That is, the backlight correction effect can be improved. In addition, flexibility in setting a mapping curve is increased, which can avoid additional processing for compromising both the shadow region and highlight region.

This, further, also means that the method described in the present embodiment is not just a simple change of the background correction method of the entire image area using the conventional histogram equalization method to backlight correction processing per block. That is, simply changing the conventional technique for detecting the backlight condition in an image area on the basis of a histogram of the entire image area and correction of the backlight condition in the image area, to a block-by-block basis will result in detection of the backlight condition in a block to correct the backlight condition in the block. However, the aforementioned method adopted by the apparatus according to the present embodiment does not detect the backlight condition in a block nor correct the backlight condition in the block. This method is to correct the backlight condition between a plurality of blocks on the basis of the luminance average value within block, which, therefore, can correct the backlight condition of the entire image area as a result without creating a histogram.

Further, since the method described in the present embodiment allows correction of the entire image area only by sequentially using information about local regions, there is no need to wait until preprocessing of the one entire image area is finished, which allows real-time processing without frame delays only by using such line memory that blocks are included or about two- or three-times more line memories than the line memory without requiring a frame memory in the circuit.

Furthermore, the method described in Embodiment 1 does not use color information for correction processing, which thus causes a problem in that a specific color is corrected too much. By the method described in the present embodiment, however, the correction amount is also controlled by the average color-difference vector of a local region, which achieves the effect of controlling a subjective influence upon a region having a specific color that tone correction makes a person perceive.

Since the subjective influence that a person perceives is particularly significant on human skin color, setting the correction amount small when the average color-difference vector of a local region is in the vicinity of almost skin color achieves the effect of reducing the subjective influence upon a human skin color image that tone correction makes a person perceive even if the image includes a portrait.

As described above, according to the present embodiment, an image area is divided into a plurality of blocks and an amount of change from the average luminance level of a local region divided as a block to the luminance level after correction is also controlled by the average color-difference vector of the local region, which achieves the effect of controlling a subjective influence that tone correction makes a person perceive upon the whole area that a region having a specific color continues widely in area.

Further, an image area is divided into a plurality of blocks and an amount of change from the average luminance level of a local region divided as a block to the luminance level after correction is controlled to decrease when the average color-difference vector of the local region is in the vicinity of almost skin color, which achieves the effect of reducing a subjective influence upon a human skin color image that tone correction makes a person perceive.

Embodiment 3

While Embodiment 1 has described the method of carrying out conversion with a conversion table in accordance with the number of levels of correction amount at the time of obtaining luminance data after correction from the correction amount per pixel, the present embodiment carries out conversion only using two types of conversion data tables.

Figure 13:
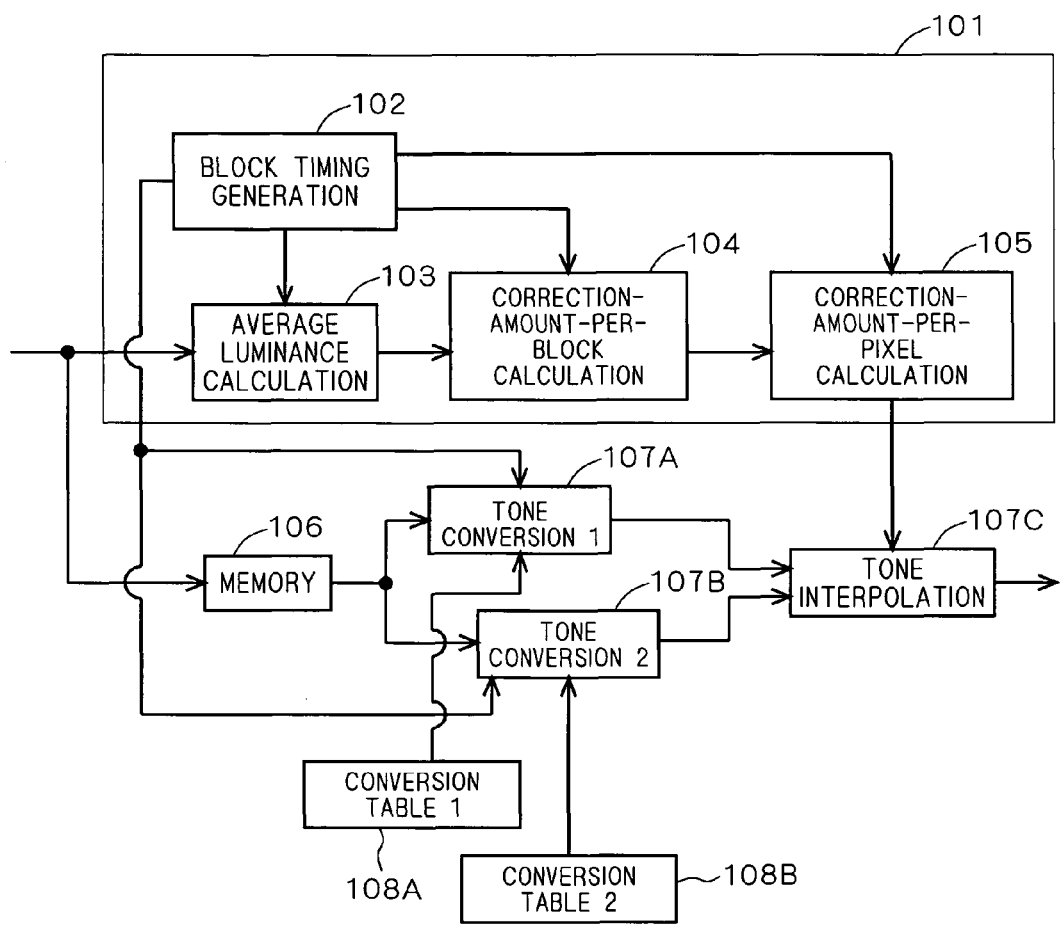
[FIG. 13] is a block diagram illustrating an exemplary configuration of a tone correction apparatus according to a third embodiment of this invention.
Figure 14:
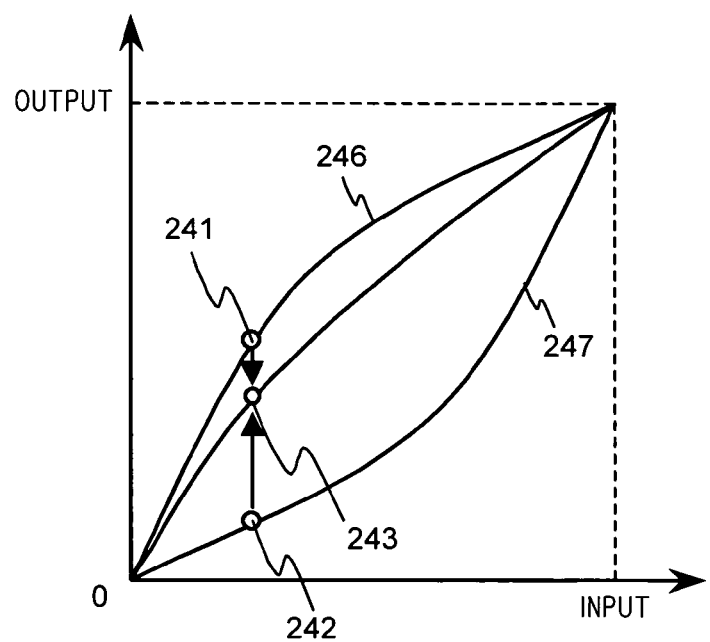
[FIG. 14] is a diagram illustrating mapping curves according to the third embodiment of this invention.

FIG. 13 is a block configuration illustrating a tone correction apparatus according to this embodiment. The configuration of FIG. 13 differs from that of FIG. 1 in the device configuration of the part that carries out tone conversion. The part that carries out tone conversion is comprised of a first tone conversion part 107A having a first conversion table 108A, a second tone conversion part 107B having a second conversion table 108B and a tone interpolation part 107C. As shown in FIG. 14, the first conversion table part 108A is previously provided with a mapping curve 246 for the case in which the correction amount has its maximum value in the positive direction, and the second conversion table part 108B is previously provided with a mapping curve 247 in which the correction amount has its maximum value in the negative direction.

Since the operations other than tone conversion are similar to Embodiment 1, the tone conversion operation in the present embodiment will only be described below.

In FIG. 13, the luminance level per pixel is input to the first tone conversion part 107A and second tone conversion part 107B from the memory 106. The first tone conversion part 107A refers to the first conversion table part 108A to obtain an output value corresponding to 241 shown in FIG. 14. On the other hand, the second tone conversion part 107B refers to the second conversion table part 108B to obtain an output value corresponding to 242 shown in FIG. 14. The tone interpolation part 107C having received these two outputs obtains a weighted average by the correction amount per pixel output from the correction-amount-per-pixel calculation part 105 to interpolate tones in accordance with the correction amount, thereby obtaining an output level corresponding to 243 in FIG. 14.

This method produces the effects of allowing the use of a conversion table adapted for tone characteristics of a system and reducing the circuit scale or program size because of reduction of conversion tables to two types.

As described in Embodiment 1 as well, a combination of straight lines may be applied to tone conversion instead of the curved tone conversion curve in order to simplify calculations to reduce circuit scale and consumption power or to achieve improved processing speed. Alternatively, instead of previously preparing a tone conversion table, the tone conversion part may be configured to obtain a conversion table by itself by sequential calculations, or a modification may be made such that the tone conversion part executes correction by direct calculations from the input correction amount without using a conversion table.

Figure 15:
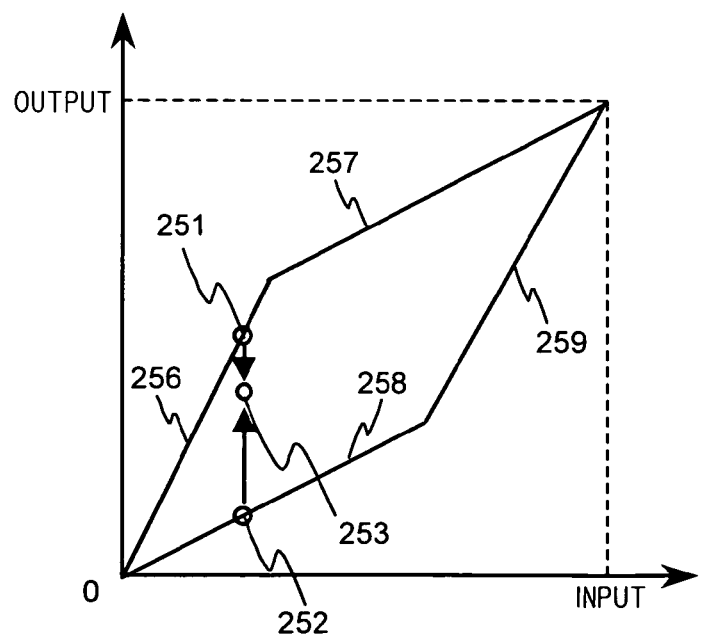
[FIG. 15] is a diagram illustrating linear mapping curves.

For instance, the use of straight lines 256 to 259 shown in FIG. 15 as mapping curves also allows the circuit scale or program size to be reduced by a calculation circuit which makes linear calculations and comparisons without using the first and second conversion tables 108A and 108B shown in FIG. 13. Specifically, input data may be subjected to tone conversion by calculations with the linear equations 256 and 257 to specify a smaller one of output results as a tone after conversion (output from the first tone conversion part) in the case where the correction amount has its maximum value in the positive direction, and similarly, to specify a larger one of conversion results by the linear equations 258 and 259 as a tone after conversion (output from the second tone conversion part) in the case where the correction amount has its maximum value in the negative direction. This method lowers the flexibility in tone characteristics due to stabilization of conversion tables as equations, but allows further reduction in circuit scale or program size as compared to the above-described method.

Note

While the embodiments of this invention have been disclosed and described in detail, the above description illustrates aspects to which the present invention is applicable, and the present invention is not limited as such. That is, numerous modifications and variations of the described aspects can be devised without departing from the scope of this invention.

For instance, the tone correction apparatus according to this invention embodied by Embodiment 1 or 2 can be implemented not only as hardware equipment but also by software processing as function execution of respective elements by a program. Illustration of FIG. 7 or 9 of this application example also shows an application example of such program.

Industrial Applicability

This invention can be applied, as an application example, to correction processing of an image captured under the backlight condition by an image capturing apparatus, but can also be applied to correction processing of an image whose tones are partially underexposed or overexposed, even though not under the backlight condition. In addition, the present invention is also applicable to improve visibility of a poor-contrast display. Further, this invention can be applied to an apparatus for carrying out image correction even if it does not include an image capturing apparatus or a display.

More specifically, the tone correction apparatus according to this invention is applicable to a mobile terminal such as a mobile phone or PDA, or digital equipment such as a personal computer.

The invention claimed is:

1. A tone correction apparatus for carrying out tone correction upon dividing one image area of a digital image into a plurality of local regions, comprising:
    an average luminance calculation part for obtaining average luminance of each of said local regions of said digital image;
    a correction amount calculation part for comparing the average luminance of each of said local regions and a predetermined value defined from a range of all luminance tone levels, thereby obtaining a direction of correction and a correction amount of the average luminance of each of said local regions to be as a first correction amount for each of said local regions;
    an interpolation part for obtaining a second correction amount for each pixel by spatial interpolation with respect to said first correction amount by using positions of each pixel located between adjacent local regions; and
    a tone conversion part for selecting for each pixel, one tone conversion function from among a previously prepared plurality of tone conversion functions by using said second correction amount, thereby correcting luminance of each pixel.

2. The tone correction apparatus according to claim 1, wherein said plurality of tone conversion functions include a first conversion function having an effect of increasing tones of a shadow part and a second conversion function having an effect of increasing tones of a highlight part.

3. The tone correction apparatus according to claim 1, further comprising
    an average color calculation part for obtaining an average color for each of said local regions, wherein
    said correction amount calculation part obtains a luminance correction amount for each of said local regions using said average luminance and said average color.

4. The tone correction apparatus according to claim 3, wherein said correction amount calculation part changes said first correction amount on the basis of a color-difference on a chromaticity diagram between said average color and a previously set specific color.

5. The tone correction apparatus according to claim 4, wherein said certain color previously specified is skin color.

6. The tone correction apparatus according to claim 5, wherein
    said correction amount calculation part decreases the range of variation caused by said correction in the case where said average color is in the vicinity of said skin color.

7. A mobile terminal comprising said tone correction apparatus according to claim 1.

8. An image capturing apparatus comprising said tone correction apparatus according to claim 1.

9. A mobile phone comprising said image capturing apparatus according to claim 8.

10. A tone correction method comprising:
    a dividing step of dividing one image area of a digital image into a plurality of local regions;
    an average luminance calculation step of using an average luminance calculation part to obtain average luminance of each of said local regions of said digital image;
    a correction amount calculation step of using a first correction amount calculation part to compare the average luminance of each of said local regions and a predetermined value defined from a range of all luminance tone levels, thereby obtaining a direction of correction and a correction amount of the average luminance of each of said local regions to be as a first correction amount for each of said local regions;
    an interpolation step of obtaining a second correction amount for each pixel by spatial interpolation with respect to said first correction amount by using positions of each pixel located between adjacent local regions; and
    a tone conversion step of using a tone conversion part to select for each pixel, one tone conversion function from among a previously prepared plurality of tone conversion functions by using said second correction amount, there by correcting luminance of each pixel.

11. The tone correction method according to claim 10, wherein said plurality of tone conversion functions include a first conversion function having an effect of increasing tones of a shadow part and a second conversion function having an effect of increasing tones of a highlight part.

12. The tone correction method according to claim 10, further comprising
    an average color calculation step of obtaining an average color for each of said local regions, wherein
    said correction amount calculation step obtains a luminance correction amount for each of said local regions using said average luminance and said average color.

13. The tone correction method according to claim 12, wherein
    said correction amount calculation step decreases the range of variation caused by said correction in the case where said average color is in the vicinity of skin color.

14. A non-transitory computer readable medium storing a computer program, said computer program causing a computer to execute tone correction processing, wherein
    said tone correction processing includes:
    dividing processing of dividing one image area of a digital image into a plurality of local regions;
    average luminance calculation processing of obtaining average luminance of each of said local regions of said digital image;
    correction amount calculation processing of comparing the average luminance of each of said local regions and a predetermined value defined from a range of all luminance tone levels, thereby obtaining a direction of correction and a correction amount of the average luminance of each of said local regions to be as a first correction amount for each of said local regions;
    interpolation processing of obtaining a second correction amount for each pixel by spatial interpolation with respect to said first correction amount by using positions of each pixel located between adjacent local regions; and
    tone conversion processing of selecting for each pixel, one tone conversion function from among a previously prepared plurality of tone conversion functions by using said second correction amount, there by correcting luminance of each pixel.

15. The non-transitory computer readable medium according to claim 14, wherein
said plurality of tone conversion functions include a first conversion function having an effect of increasing tones of a shadow part and a second conversion function having an effect of increasing tones of a highlight part.

16. The non-transitory computer readable medium according to claim 14, said tone correction processing further comprising
an average color calculation processing of obtaining an average color for each of said local regions, wherein
said correction amount calculation processing obtains a luminance correction amount for each of said local regions using said average luminance and said average color.

17. The non-transitory computer readable medium according to claim 16, wherein
said correction amount calculation processing decreases the range of variation caused by said correction in the case where said average color is in the vicinity of skin color.

* * * * *